(12) United States Patent
Sako et al.

(10) Patent No.: US 7,593,311 B2
(45) Date of Patent: Sep. 22, 2009

(54) RECORDING MEDIUM, RECORDING METHOD, RECORDING DEVICE, REPRODUCTION DEVICE, DATA TRANSMISSION METHOD, AND SERVER DEVICE

(75) Inventors: Yoichiro Sako, Tokyo (JP); Etsuo Shibasaki, Tokyo (JP); Yoriaki Kanada, Kanagawa (JP); Akiya Saito, Kanagawa (JP); Koichi Nakajima, Chiba (JP); Shunsuke Furukawa, Tokyo (JP); Kaoru Kijima, Tokyo (JP); Akiko Inoue, Saitama (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 886 days.

(21) Appl. No.: 10/486,920

(22) PCT Filed: Jun. 25, 2003

(86) PCT No.: PCT/JP03/08047

§ 371 (c)(1),
(2), (4) Date: Feb. 24, 2004

(87) PCT Pub. No.: WO04/001727

PCT Pub. Date: Dec. 31, 2003

(65) Prior Publication Data

US 2004/0199523 A1    Oct. 7, 2004

(30) Foreign Application Priority Data

Jun. 25, 2002  (JP)  .............................. 2002-184972
Aug. 29, 2002  (JP)  .............................. 2002-251682

(51) Int. Cl.
G11B 7/007 (2006.01)
(52) U.S. Cl. ...................................... 369/275.3; 726/26
(58) Field of Classification Search .............. 369/47.22, 369/30.25, 30.3, 275.3; 726/26
See application file for complete search history.

(56) References Cited

U.S. PATENT DOCUMENTS 5,661,703 A * 8/1997 Moribe et al. ................. 369/14

(Continued)

FOREIGN PATENT DOCUMENTS

EP  0 924 930 A2   6/1999

(Continued)

OTHER PUBLICATIONS

U.S. Appl. No. 10/485,261, filed Feb. 9, 2004, Kanada et al.

(Continued)

*Primary Examiner*—Wayne R Young
*Assistant Examiner*—Thomas D Alunkal
(74) *Attorney, Agent, or Firm*—Oblon, Spivak, McClelland, Maier & Neustadt, L.L.P.

(57) ABSTRACT

A recording medium is applicable to information service system for receiving and transmitting information when a terminal device on the user's side accesses an administrative server, which is a server device, using a communication line such as the Internet. This recording medium (10a) comprises a lead-in region (16a), a data recording region (14a) positioned on an outer region than the lead-in region, and a lead-out region (12a) positioned on an outer region than the data-recording region. In at least any one of these regions (12a), (14a), and (16a), multiple pieces of identification information are recorded.

7 Claims, 12 Drawing Sheets

| CONTENTS | UID | SERVICED (SELECTED) |
|---|---|---|
| A | $UID_1$ | |
| B | $UID_2$ | |
| C | $UID_3$ | |
| D | $UID_4$ | |
| E | $UID_5$ | |

U.S. PATENT DOCUMENTS

| | | | | |
|---|---|---|---|---|
| 5,818,812 | A * | 10/1998 | Moribe et al. | 369/47.15 |
| 5,841,145 | A | 11/1998 | Satoh et al. | |
| 6,134,659 | A * | 10/2000 | Sprong et al. | 713/190 |
| 6,301,569 | B1 * | 10/2001 | Oshima et al. | 705/57 |
| 6,633,534 | B1 * | 10/2003 | Tosaki et al. | 369/275.3 |
| 6,694,023 | B1 * | 2/2004 | Kim | 380/203 |
| 6,724,705 | B1 * | 4/2004 | Ko et al. | 369/53.21 |
| 6,873,594 | B2 * | 3/2005 | Eom et al. | 369/275.1 |
| 7,065,503 | B2 * | 6/2006 | Matsushima et al. | 705/51 |
| 2001/0019559 | A1 * | 9/2001 | Handler et al. | 370/468 |
| 2001/0056545 | A1 * | 12/2001 | Takechi et al. | 713/200 |
| 2002/0062442 | A1 * | 5/2002 | Kurahashi | 713/176 |
| 2002/0083319 | A1 * | 6/2002 | Ishiguro et al. | 713/168 |
| 2002/0099661 | A1 * | 7/2002 | Kii et al. | 705/51 |

FOREIGN PATENT DOCUMENTS

| | | |
|---|---|---|
| EP | 1 067 789 A1 | 1/2001 |
| EP | 1 396 791 A1 | 3/2004 |
| JP | 60-050667 | 3/1985 |
| JP | 10-208388 | 8/1998 |
| JP | 11-238303 | 8/1999 |
| JP | 2001-307334 | 11/2001 |
| WO | WO 98/53445 | 11/1998 |

OTHER PUBLICATIONS

U.S. Appl. No. 10/486,920, filed Feb. 24, 2004, Sako et al.
U.S. Appl. No. 10/488,227, filed Mar. 2, 2004, Sako et al.
U.S. Appl. No. 10/490,210, filed Mar. 30, 2004, Sako et al.
U.S. Appl. No. 10/497,159, filed Jun. 7, 2004, Sako et al.

* cited by examiner

FIG. 11

| CONTENTS | UID | SERVICED (SELECTED) |
|---|---|---|
| A | $UID_1$ | |
| B | $UID_2$ | |
| C | $UID_3$ | |
| D | $UID_4$ | |
| E | $UID_5$ | |

FIG. 12

| CONTENTS | UID | SERVICED (SELECTED) |
|---|---|---|
| A | $UID_1$ | ◯ |
| B | $UID_2$ | |
| C | $UID_3$ | ◯ |
| D | $UID_4$ | |
| E | $UID_5$ | ◯ |

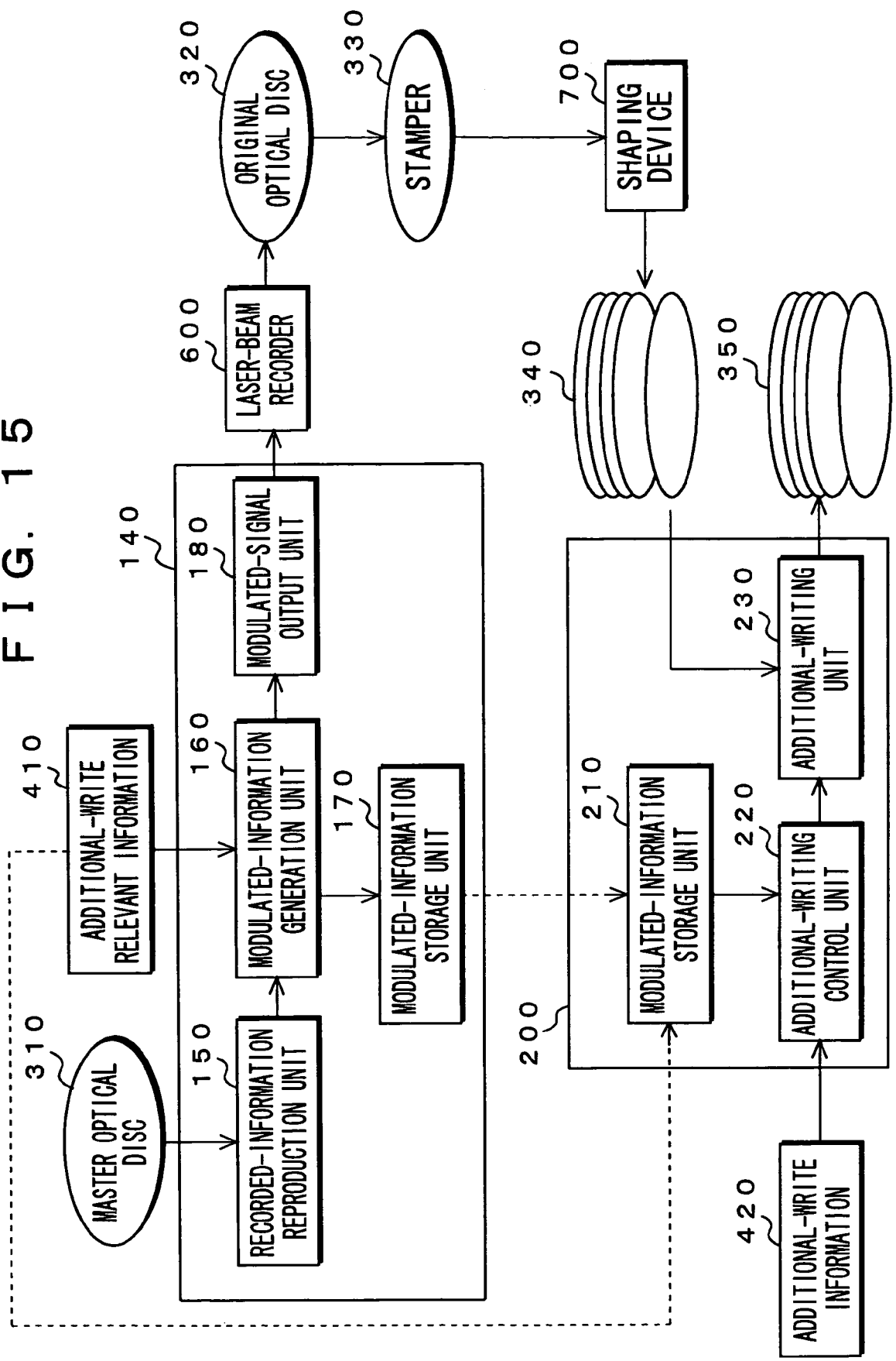

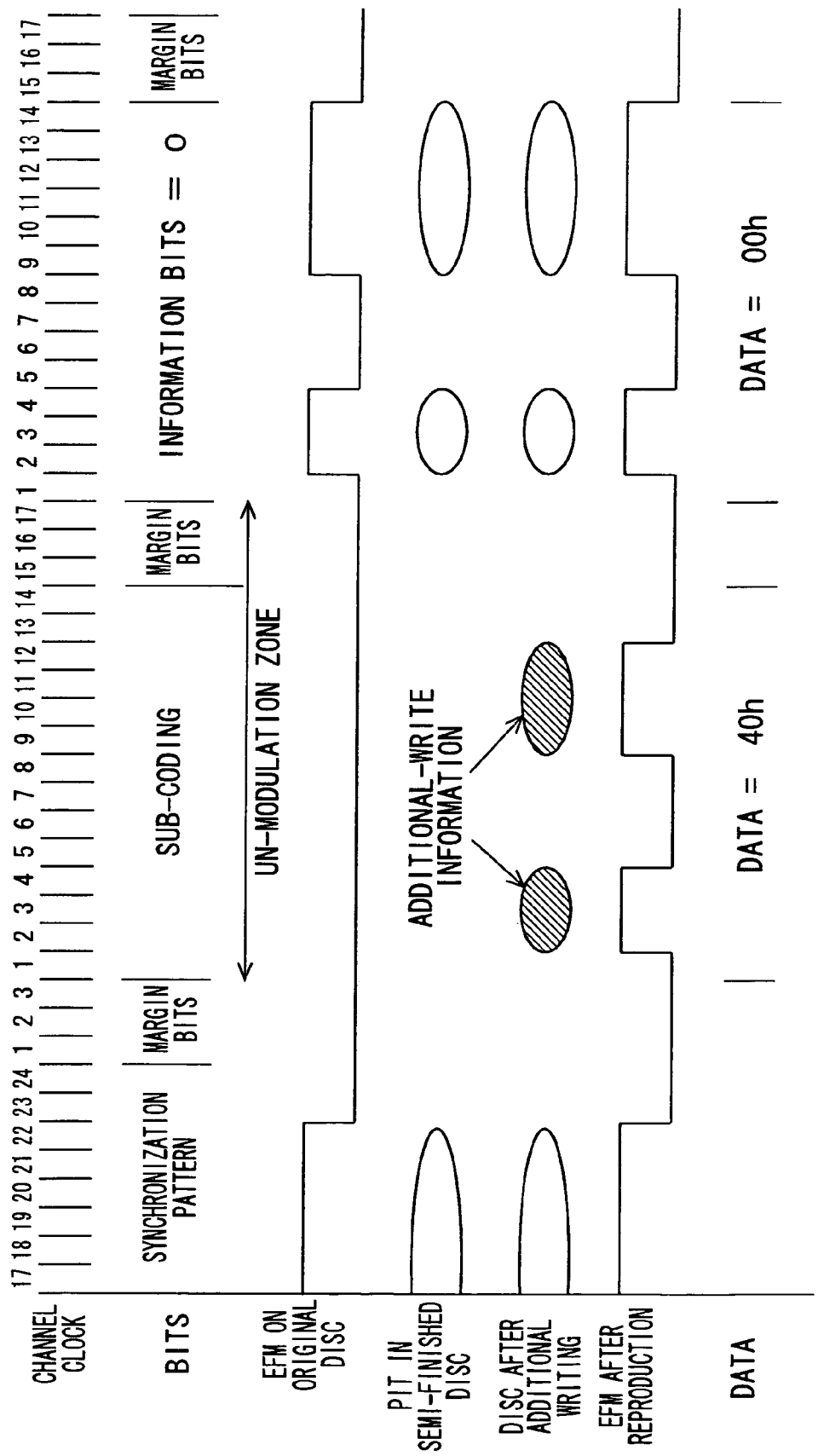

RECORDING MEDIUM, RECORDING METHOD, RECORDING DEVICE, REPRODUCTION DEVICE, DATA TRANSMISSION METHOD, AND SERVER DEVICE

TECHNICAL FIELD

The present invention relates to a recording medium, a recording method, recording apparatus, reproduction apparatus, a data transmission method, and a server device.

BACKGROUND ART a recorded or recordable recording medium such as a compact disc (CD) or a digital versatile disc (DVD) as been considered to record identification information (ID) peculiar to a recording medium. According to the record thereof, this identification information can be used as an identifier for deciding whether this recording medium is an authentic one or an illegally copied one. Alternatively, this identification information can be also used as identifier for enjoying various services.

The various services refer to information (contents) that is not particularly related to information recorded or to be recorded on recording medium, that is, music information, information about artists etc. related to music information, image information (still images, moving images), or digital data such as program data which is used in a computer according to circumstances. Of course, it is possible to provide, as contents for service, information that is related to information recorded or to be recorded on a recording medium.

PROBLEMS THAT THE INVENTION SHOULD SOLVE

If this identification information is ranked at one function of an identifier required to enjoy the various services, it is possible to access, for example, a particular service institution using a terminal device capable of reproducing this recording medium and further use this identification information as authentication information, thereby constituting such an information service system as to enjoy a particular service.

However, in this case, only one service is usually enjoyable. This is, the identification information and the corresponding enjoyable service have one-to-one relationship with each other. A system such that the identification information authenticated by one access causes only one particular service to be enjoyed is provided in so many cases. This service may be repeated to infinity if the identification information is authenticated irrespective of whether or not a fee therefor is paid, so that it allows unlimited access to this service and the numbers of times that this service is enjoyable and the like are not limited.

Thus, it is possible to enjoy the same service, for example, repeatedly while it is impossible to use the identification information recorded on a recording medium as the identification information to be used when it provides the limited services for a purchaser of the recording medium, for example. It, however, would be preferable to limit the number of times for accessing the service that he or she enjoys according to a purchased price of the recording medium by only the identification information. Alternatively, it would be further preferable to limit the number of separate contents that may enjoy the service. This is because a side of service institution watches numbers of times for the used identification information to realize the limited services.

DISCLOSURE OF THE INVENTION

The present invention has been developed to solve these conventional problems. According to the present invention, a recorded or writable recording medium records multiple pieces of identification information beforehand, and a service institution (an administrative server) watches numbers of pieces of the recorded identification information to realize enjoyment of a particular service or a desired service by only the numbers of pieces of the recorded identification information.

To solve these technical problems, a recording medium related to the present invention described in claim 1 comprises a lead-in region, a data-recording region positioned on an outer peripheral region than the lead-in region, and a lead-out region positioned on an outer peripheral region than the data-recording region, wherein multiple pieces of identification information are recorded in at least any one of the lead-in region, the data-recording region, and the lead-out region.

A recording apparatus related to the present invention comprises a modulation-processing portion for performing a modulation processing on received data and performing a modulation processing to create a region for recording the identification information additionally thereon, and a recording portion for performing a record on an original disc based on data output from the modulation-processing portion.

A recording method related to the present invention comprises the steps of performing a modulation processing on received data and, during the modulation processing, performing a modulation processing to create a region for recording the identification information additionally thereon, modulating laser light based on the modulated data, and irradiating the modulated laser light to an original disc to realize a recording.

A recording method related to the present invention comprises the steps of recording multiple pieces of identification information on a region of a recording medium where data having at least one of predetermined patterns are recorded, the recording medium comprising a lead-in region, a data-recording region positioned on an outer peripheral region than the lead-in region, and a lead-out region positioned on an outer peripheral region than the data-recording region, wherein multiple items of the data having the predetermined pattern are recorded in at least any one of the lead-in region, the data-recording region, and the lead-out region.

A reproduction apparatus related to the present invention comprises a head portion for reading data out of a recording medium, the recording medium comprising a lead-in region, a data-recording region positioned on an outer peripheral region than the lead-in region, and a lead-out region positioned on an outer peripheral region than the data-recording region, wherein multiple pieces of identification information are recorded in at least any one of the lead-in region, the data-recording region, and the lead-out region, a demodulation-processing portion for performing demodulation processing on an output signal provided from this head portion, an extraction portion for extracting the identification information from an output signal provided from this demodulation processing portion, and a memory for storing the identification information extracted by this extraction portion.

A data transmission method related to the present invention comprises the steps of transmitting to a server device multiple pieces of identification information read out of a recording medium that has recorded the multiple pieces of the identification information by means of a terminal device; causing the server device to verify the multiple pieces of the transmitted identification information for authenticating them, and reading data corresponding to the multiple pieces of the transmitted identification information and transmitting the data to the terminal device when the multiple pieces of the transmitted identification information are authenticated properly.

A server device related to the present invention comprises a transmission-and-reception portion for receiving multiple pieces of identification information read out of a recording medium that has recorded the multiple pieces of the identification information by means of a terminal device via a communication line network and transmitting data via the communication line network; a storage portion for storing multiple items of contents-data; and a control portion for authenticating the multiple pieces of identification information received by transmission-and-reception portion and allowing contents-data corresponding to the multiple pieces of the received identification information to be read out of the storage portion when the multiple pieces of the received identification information is properly authenticated, and then causing the transmission-and-reception portion to transmit the contents-data.

BRIEF DESCRIPTION OF THE DRAWINGS

FIG. 11 is a table for showing relationship between pieces of the identification information and each of the service contents;

FIG. 12 is a table for showing relationship among pieces of the identification information, each of the service contents, and the services;

FIG. 15 is a schematic diagram for showing an embodiment of a recording device for the identification information when the identification information is recorded in a recorded recording medium; and FIG. 16 is an explanatory illustration of the operations.

BEST MODE FOR CARRYING OUT THE INVENTION

The following will describe in detail one embodiment of a recording medium etc. related to the present invention with reference to drawings.

Figure 1:
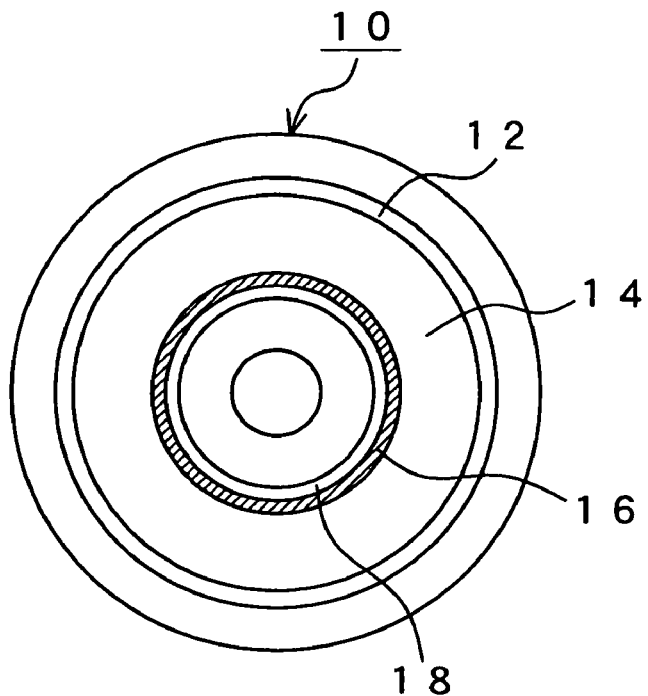
FIG. 1 is a conceptual diagram for showing an embodiment of a writable recording medium related to the present invention.

FIG. 1 shows an embodiment of a disc-shaped recording medium 10, which is a writable recording medium related to the present invention. This recording medium 10 has a data-recording region 14 and auxiliary recording regions 16 and 18. The data-recording region 14 is a region in which a terminal device (not shown) can write data and the auxiliary recording regions 16 and 18 are regions in which the terminal device cannot write data.

In the innermost-periphery region 18 of the auxiliary recording regions 16 and 18, identification information or the like is recorded and in the data-recording region 14, original data (particular contents-data) is recorded.

This writable recording medium may typically be a write-once CD-R (CD-Recordable) disc, a rewritable CD-RW (CD-Rewritable) disc, a write-once DVD-R (DVD-Recordable) disc, a rewritable DVD-RW (DVD-Rewritable) disc and the like.

The optical disc 10 has a basic construction such that a lead-out region 12 is positioned at an outermost periphery and, on its inner side, a program area (PA) 14, which is a contents-data recording area, is positioned. This program area 14 corresponds to the data-recording region. On an inner-periphery region of the program area 14, a lead-in area 16 for recording TOC information is positioned, and then, on an inner-periphery region thereof, a program memory area (PMA) 18 is provided. The lead-in area 16 and the program memory area 18 correspond to the auxiliary recording region.

As well known, in the program memory area 18, temporary TOC information is recorded before complete processing or finalization processing is performed. As far as temporary TOC information is recorded in the program memory area 18, contents-data can be written further in the program area 14. However, if an operation that should perform complete processing is performed, TOC information is written in the lead-in area 16, so that subsequently write (record) processing of the data such as the contents-data is impossible any more.

Figure 2:
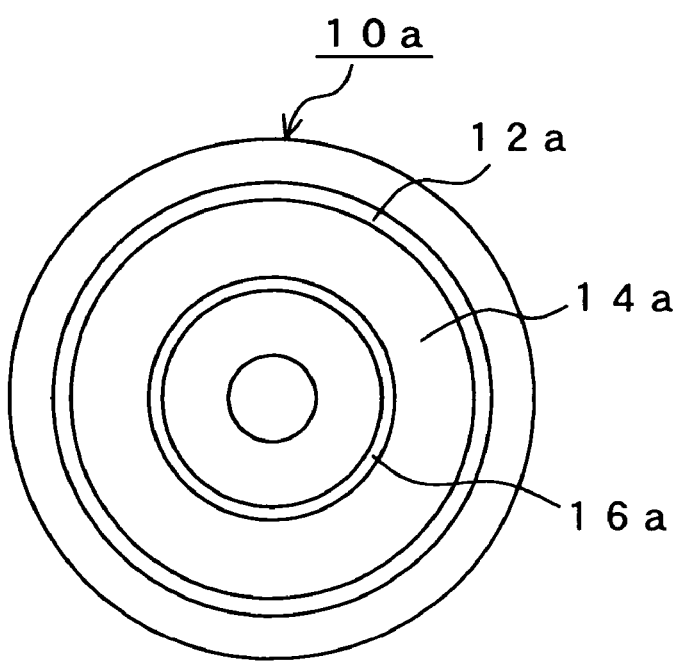
FIG. 2 is a conceptual diagram for showing an embodiment of a recorded recording medium related to the present invention.

FIG. 2 shows an optical disc 10a serving as a recorded recording medium in which data is recorded during press process. This optical disc 10a comprises a program area 14a serving as a data-recording region in which data is recorded, a lead-out area 12a placed on its outer periphery region, and a lead-in area 16a placed on its inner periphery region. This recorded recording medium may typically be a CD-ROM disc, a DVD-ROM disc, etc.

On the recording medium 10 or 10a shown in FIG. 1 or 2, multiple pieces of identification information UID are recorded. When a particular administrative server is accessed, the identification information UID is used for acquiring information (contents-data for service etc.) accumulated at the administrative server. It is also utilized as a kind of service to be provided to a person who has purchased the recording medium 10 or 10a legitimately.

Multiple pieces of the identification information (UID) are recorded on the recording medium 10 or 10a. The identification information UID consists of only desired figure number(s) or a combination of the number(s), symbol(s), and the like. As the identification information UID, in addition to the data row, information row adding various pieces of ancillary information such as a service method for a user, a service time (date, hour, and the like), and a species of medium may further be used as the identification information. The following will explain a case where identification information without adding any ancillary information is used.

Figure 3A:
FIGS. 3A and 3B are illustrations each for showing multiple pieces of identification information which is recorded on a recording medium related to the present invention.
Figure 3B:

It is conceivable that multiple pieces of the identification information UID each having the same contents should be used as shown in FIG. 3A or multiple pieces of the identification information, UID1 through UIDn (n indicates arbitrary number) each having different contents should be used as shown in FIG. 3B.

In a case where the identification information is shown in FIG. 3A, it is preferable that particular service contents are illustratively obtained at multiple times. In a case where the identification information is shown in FIG. 3B, it is preferable that when particular service contents are illustratively obtained, n different species of service contents should be obtained.

The identification information UID is recorded on the above area in the above recording medium 10, 10A where the data can be read out thereof but cannot be rewritten thereto with it being recorded successively or in a distributed manner. The detailed case thereof will be explained later. In a case where the writable optical disc 10 as shown in FIG. 1 is used, it is recorded on the program memory area 18 successively or in a distributed manner. On the area, address information is also recorded as information indicating a position on which the identification information UID is recorded in a part of TOC information.

In a case where the recorded optical disc 10a, as shown in FIG. 2, that the data has been recorded during the press process is used, it is recorded on, starting the program area 14a, any one of the lead-out region 12a and the lead-in region 16a or over any two areas, successively or in a distributed manner. In this case, positional information indicating that the identification information UID is recorded in any address of any area, this is, address information is recorded as a part of TOC information at the same instance that the identification information is recorded.

Figure 4:
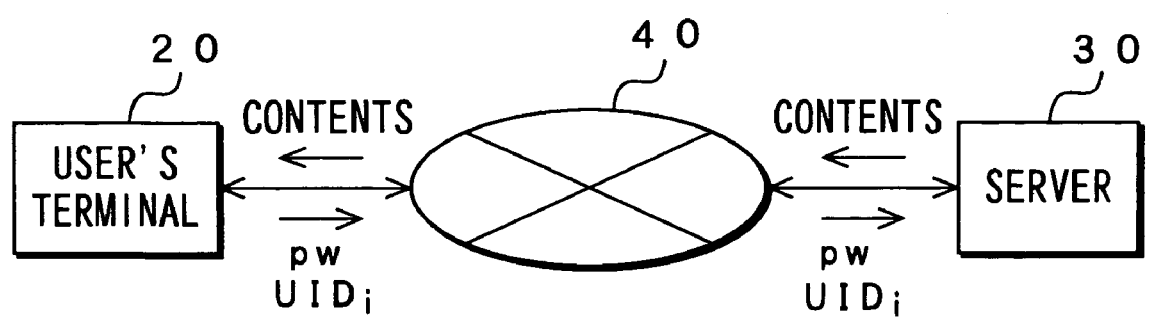
FIG. 4 is a schematic diagram for showing an outline of an information service system related to the present invention.

It is to be noted that an information service system to which the present invention can be applied is, as shown in FIG. 4, constituted by connecting a terminal device 20 for receiving services and a identification information administrative server (server device) 30 in which contents for service are accumulated to each other via a communication line network 40 such as the Internet.

When the side of the terminal device 20 transmits identification information UID read out by means of the side of the terminal device 20 to the side of the administrative server 30 and then, when this transmitted identification information UID is authenticated properly in the administrative server 30, a service accumulated in the administrative server 30 is provided to the terminal device 20. This service is like a bonus for a legitimate purchaser of the optical disc 10, 10a. A bonus, for example, according to a price of the optical disc 10, 10a, this is, a service is previously set, thus, when a user accesses the bonus, i.e. the service, it may be provided to the user at no charge.

In FIG. 4, a configuration such that only one terminal device 20 is connected to the server 30 via the communication line network 40 is shown for simplification. In fact, however, multiple terminal devices are connected to the server 30 via the communication line network 40.

The terminal device 20 has a reproduction function capability of disc and a recording/reproduction function capability of data, by which original data may be read out of the optical disc 10, 10a and reproduced. It may also read the identification information UID recorded on the optical disc 10, 10a and receive a particular service using the read identification information UID. Therefore, the following will be described on the optical disc 10, 10a that is recorded recording medium such as CD-ROM disc.

Figure 5:
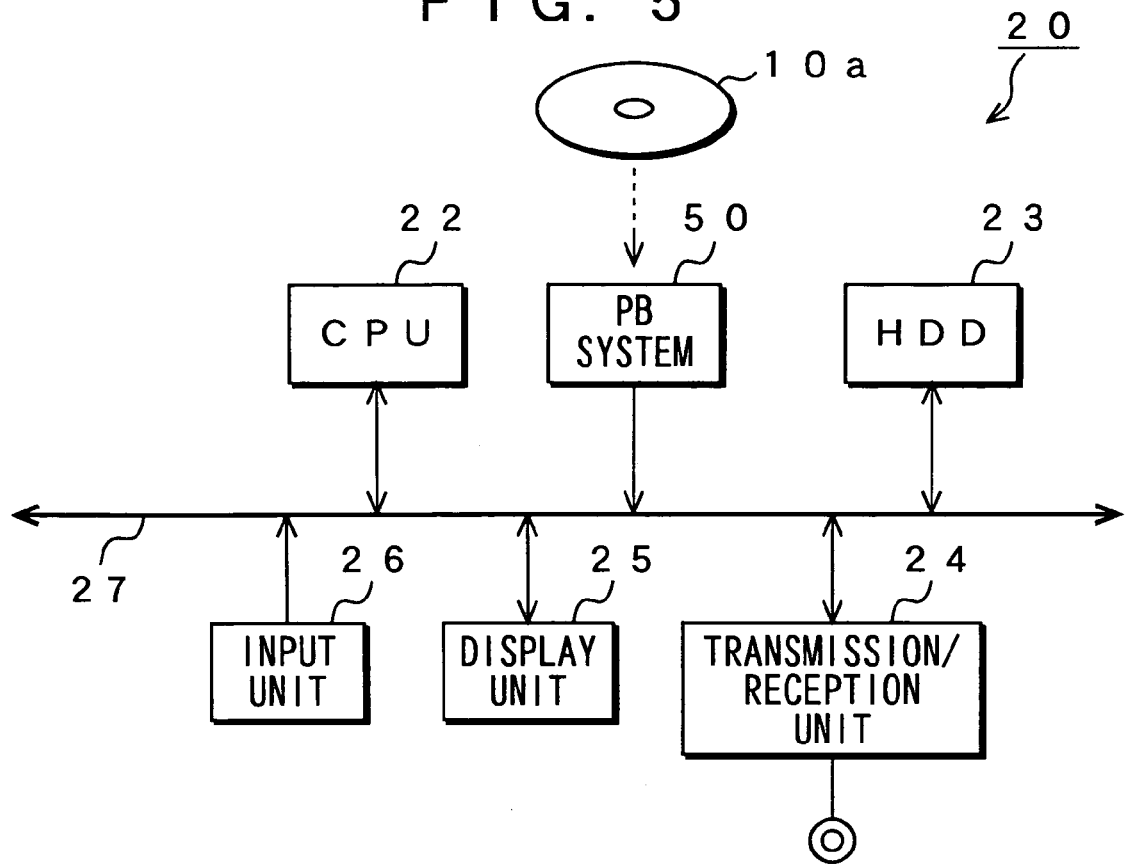
FIG. 5 is a schematic diagram for showing an embodiment of terminal device related to the present invention.

FIG. 5 shows a configuration of an embodiment of this terminal device 20, which has a reproduction apparatus 50 for reproducing the optical disc 10, 10a as described above. This terminal device 20 comprises a control unit 22 constituted of a CPU for controlling the device as a whole, a storage unit 23 constituted of, in this example, a hard disc for recording and saving various kinds of data, and a data transmission/reception unit 24 (serving as a communication interface) for giving data to and receiving it from an outside, which units are connected to a bus 27. Furthermore, a display unit 25 such as an LCD and an input unit 26 constituted of a keyboard for inputting operation information are connected to each other via the bus 27.

By providing such a configuration, the terminal device 20 performs reproduction processing of data including identification information from the optical disc 10, 10a, data transmission and reception processing to/from the outside via the communication line network, storage processing for storing the received data, and the like. The control unit 22 has a built-in memory (not shown) such as a ROM in which processing programs required to perform these processing items are stored.

Figure 6:
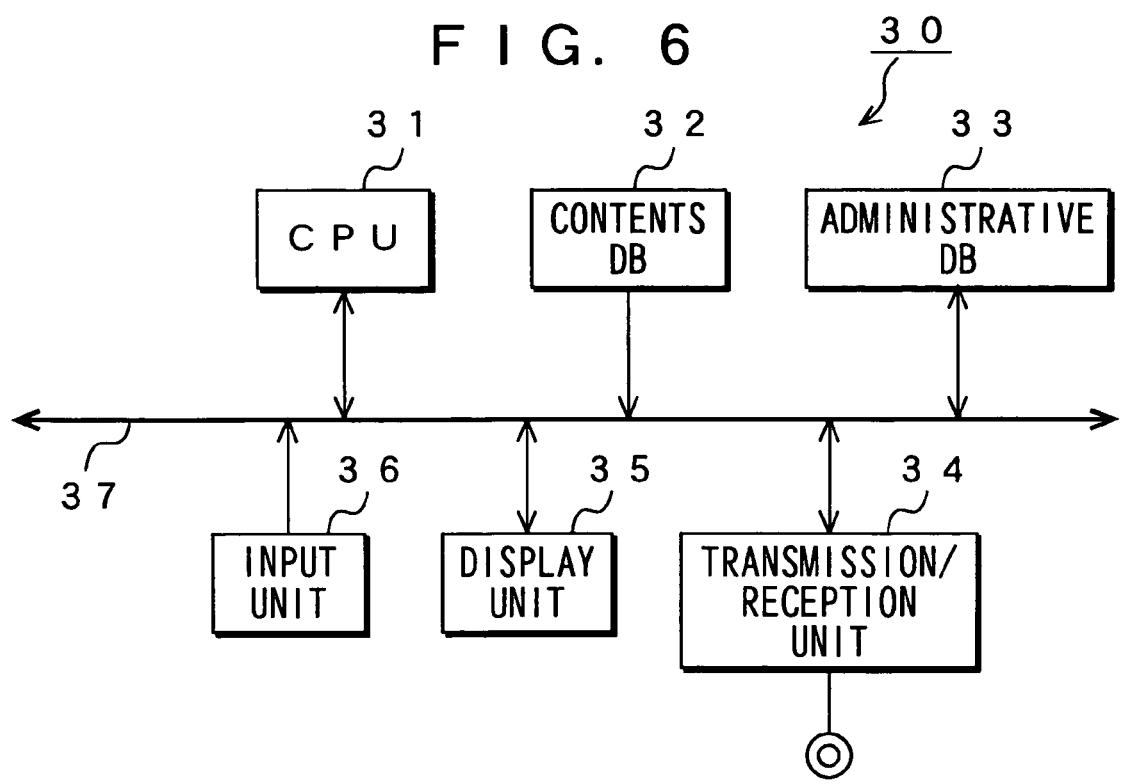
FIG. 6 is a schematic diagram for showing a substantial part of an embodiment of an administrative server used in the present invention.

FIG. 6 shows a configuration of an embodiment of the administrative server 30. The administrative server 30 has such the configuration that it authenticates identification information transmitted from a user, and, if the transmitted identification information is authenticated properly, a previously prepared service is provided, and thus, it also performs administrative processing for administer the number of times of service and the like.

For this purpose, as shown in FIG. 6, this administrative server 30 comprises a control unit 31 having a CPU for controlling the server as a whole, a database (storage) unit 32 in which contents-data for service is accumulated, and an administrative database unit 33 in which a variety of kinds of administrative information such as identification information UID peculiar to the optical disc, and the number of times of service is accumulated. Besides these, a transmission/reception unit 34 (serving as a communication interface) for transmitting and receiving data to/from an outside, a display unit 35 constituted of an LCD for displaying information such as identification information UID, an input unit 36 such as a keyboard or a mouse used for inputting of information, and the like are connected to a bus 37.

Figure 7:
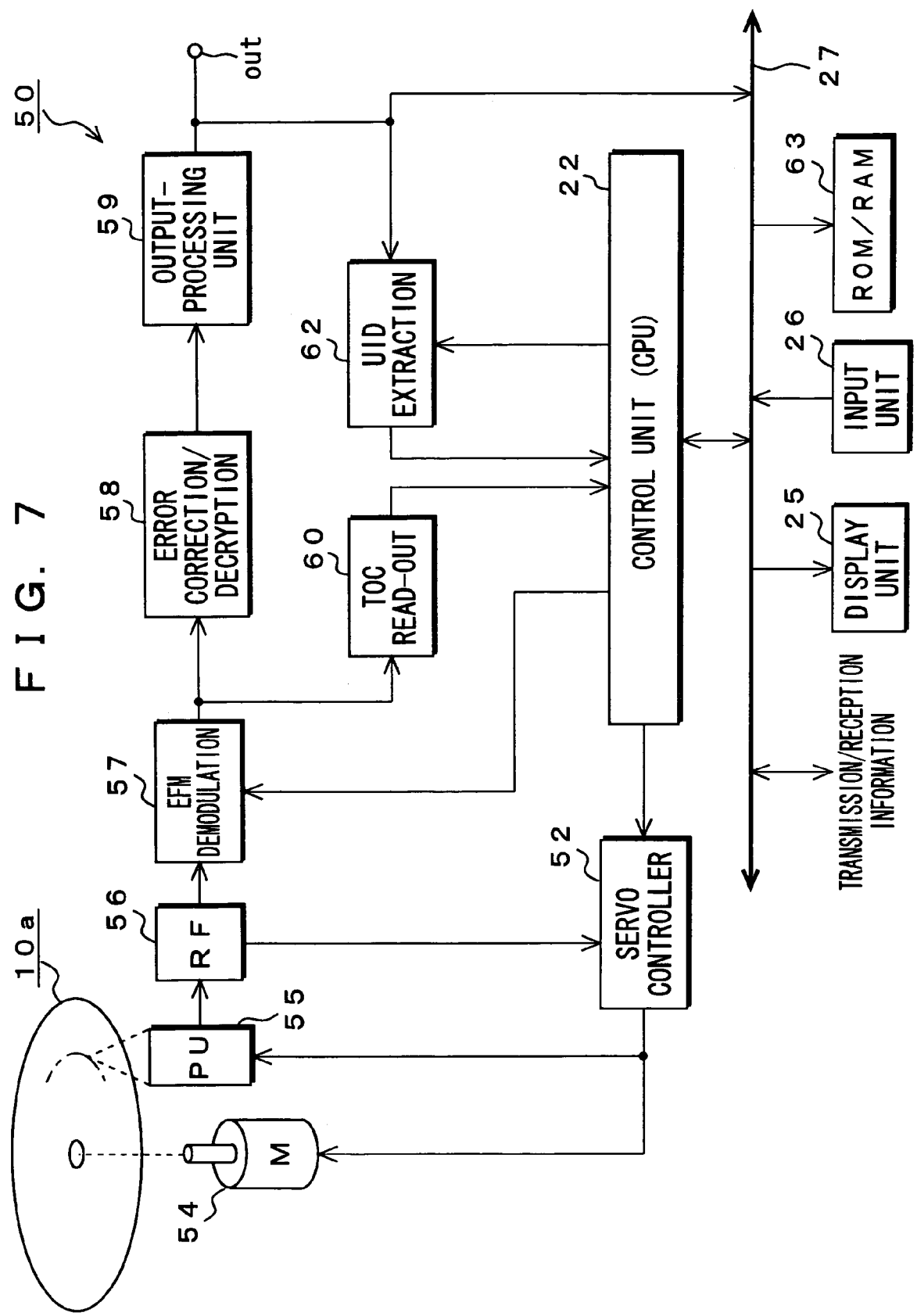
FIG. 7 is a schematic diagram for showing a substantial part of another embodiment of a reproduction apparatus for identification information related to the present invention.

FIG. 7 is a schematic diagram for showing a substantial part of an embodiment of a reproduction apparatus 50 related to the present invention.

Controlling a servo controller 52 using a control signal from the control unit 22 allows a spindle motor 54 to rotate so that the optical disc, for example, the optical disc 10a rotates at a constant linear velocity, whereupon recording information from the optical disc 10a is read by an optical pickup (head unit) 55. Reflected light from the optical disc 10a is converted into an electric signal by a photo-detector of the optical pickup unit 55 and then, an output signal from the optical pickup unit 55 is supplied via an RF amplifier 56 to a demodulator (demodulation processing unit) 57 where it performs demodulation (EFM demodulation) processing.

Of the output signals provided by the demodulator 57, an output signal based on the data read out of the program area 14 is further supplied to a downstream-side error correction/decryption circuit 58 where it performs error correction processing and decryption processing. Thereafter, it is output via an output-processing unit 59 from an output terminal as reproduction output information and then, an output signal from the output-processing unit 59 is also supplied to a identification information extraction unit 62 where identification information UID recorded on the optical disc 10*a* is extracted and separated.

On the other hand, the demodulated output signal that has performed EFM demodulation at the demodulator 57 is also supplied to a TOC read-out unit 60 for extracting TOC information, where the TOC information is extracted and separated from it. The extracted and separated TOC information is supplied to the control unit 22 where address information including the recorded identification information is extracted from the TOC information. This address information is utilized to extract and separate only the identification information UID from the output signal of the output-processing unit 59 that has been supplied to the extraction unit 62, and then the identification information UID is written and saved in a memory (RAM) 63 temporarily.

In response to input information from the input unit 26, the identification information UID is read out of the memory 63 and then, the read identification information UID is transmitted to a side of the administrative server 30 via the transmission/reception unit (not shown).

It is to be noted that original data (image data etc.) recorded in the optical disc 10*a* is supplied from the output-processing unit 59 via the bus 27 to the display unit 25 where images etc. are reproduced and, as necessary, they are output to an outside of the reproduction apparatus 50.

Figure 8:
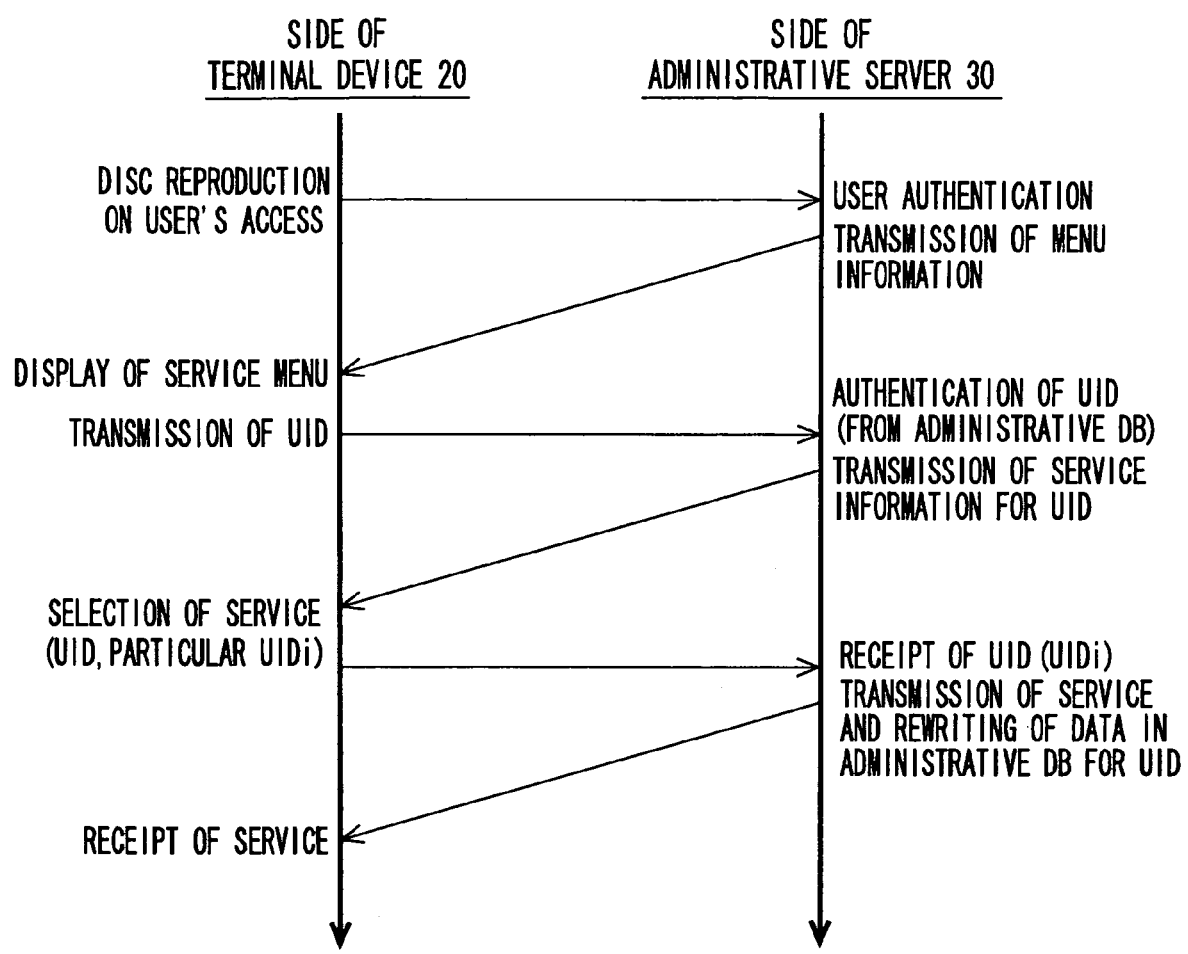
FIG. 8 is a flowchart for showing an example of data processing between the terminal device and the administrative server.

The following will describe various processing examples in a case where an information service system such as shown in FIG. 4 is constituted, with reference to FIG. 8 and the following. FIG. 8 is an explanatory outline (flowchart) for describing one example of a data transmission method, which is overall processing of this information service system and by which a side of the terminal device 20 reproduces the optical disc, for example, the optical disc 10*a* to read identification information UID out of the optical disc 10*a* and acquire it. This identification information UID read out of the optical disc 10*a* is saved in the memory 63. The identification information UID read out of the optical disc 10*a* can be displayed at the display unit 25 simultaneously or made unknown, taking account of safety.

Next, the user performs processing for accessing the administrative server 30. In this case, since the user must be authenticated, the side of the user transmits a password PW, which has been set up between him/her and the administrative server 30 beforehand, from the terminal device 20 to the administrative server 30. If based on the transmitted password PW, the administrative server 30 authenticates the user properly, a side of the administrative server 30 transmits to the terminal device 20 menu information (service menu) to be handled on the side of the administrative server. Then, on the side of user, the service menu is displayed on the terminal device 20. If the user selects a service menu using the identification information UID based on the displayed service menu, all the identification information UID read out of the optical disc 10*a* is transmitted from the terminal device 20 to the side of the administrative server 30.

At the side of the administrative server 30, performed is authentication processing such that it authenticates the received identification information UID on whether the received identification information UID is legitimate identification information utilizing administrative information for each medium accumulated in the administrative database 33. This is done in order to exclude illegal access etc. by an optical disc as an illegally copied recording medium. As the medium administrative information for this case, administrative information (which is the same information as the identification information) peculiar to a medium provided from a disc manufacturer or a disc trader is utilized.

If the side of the administrative server 30 has no administrative information peculiar to the medium, by checking whether the identification information UID has a legitimate data structure or the like, it is possible to decide whether the identification information is authentic one, illegally acquired one, or illegal one created by illegal copy. If the identification information UID is decided to be authentic, it is registered in the side of the administrative server 30 together with the user's password PW that has been already received.

Subsequently, when a request signal or command for transmission of service information that is enjoyable by means of the identification information UID is transmitted from the terminal device 20, the side of the administrative server 30 selects the contents-data for service. In this case, it selects the contents-data for service that corresponds to the received identification information UID, and then it provides to the side of user, i.e. the terminal device 20 the selected contents-data for service.

When the side of the user transmits particular identification information UIDi to the administrative server 30, the administrative server 30 selects the contents-data for service that corresponds to the transmitted identification information UIDi and transmits this contents-data for service to the terminal device 20. The side of user, i.e. the terminal device 20 receives the transmitted contents-data for service. The received contents-data for service is saved in the storage unit 23 temporarily and then, it is displayed on the display unit 25. This allows the service using the identification information UID or UIDi to be provided to illegal purchaser of the optical disc 10*a*.

If it is done based on the request for perform the service of the contents-data for service, i.e. the one from the terminal device 20, rewriting processing of the administrative information of the administrative database 33 in the administrative server 30 is performed. If services of n times of same contents-data for service are illustratively performed, decrement processing corresponding to the service times is done and then, a result thereof is saved on the database 33 as administrative information. Alternatively, if services of n different items of the contents-data for service are performed, the database 33 saves which items of the contents-data for service is provided together with its numbers of times as the administrative information at the same time.

If all services corresponding to the identification information UID transmitted from the terminal device 20 are completely provided, the services on this optical disc 10*a* are finished. It is noted that, when all services are finished, any bonus service can be illustratively carried out. A detailed explanation thereof will be described.

If a service is provided, a system is configured so that the side of the user can eliminate selection of the contents-data for service in exchange for the selection of service, and provide merely the contents-data for service that the side of the administrative server 30 has set beforehand corresponding to the identification information UID.

Figure 9:
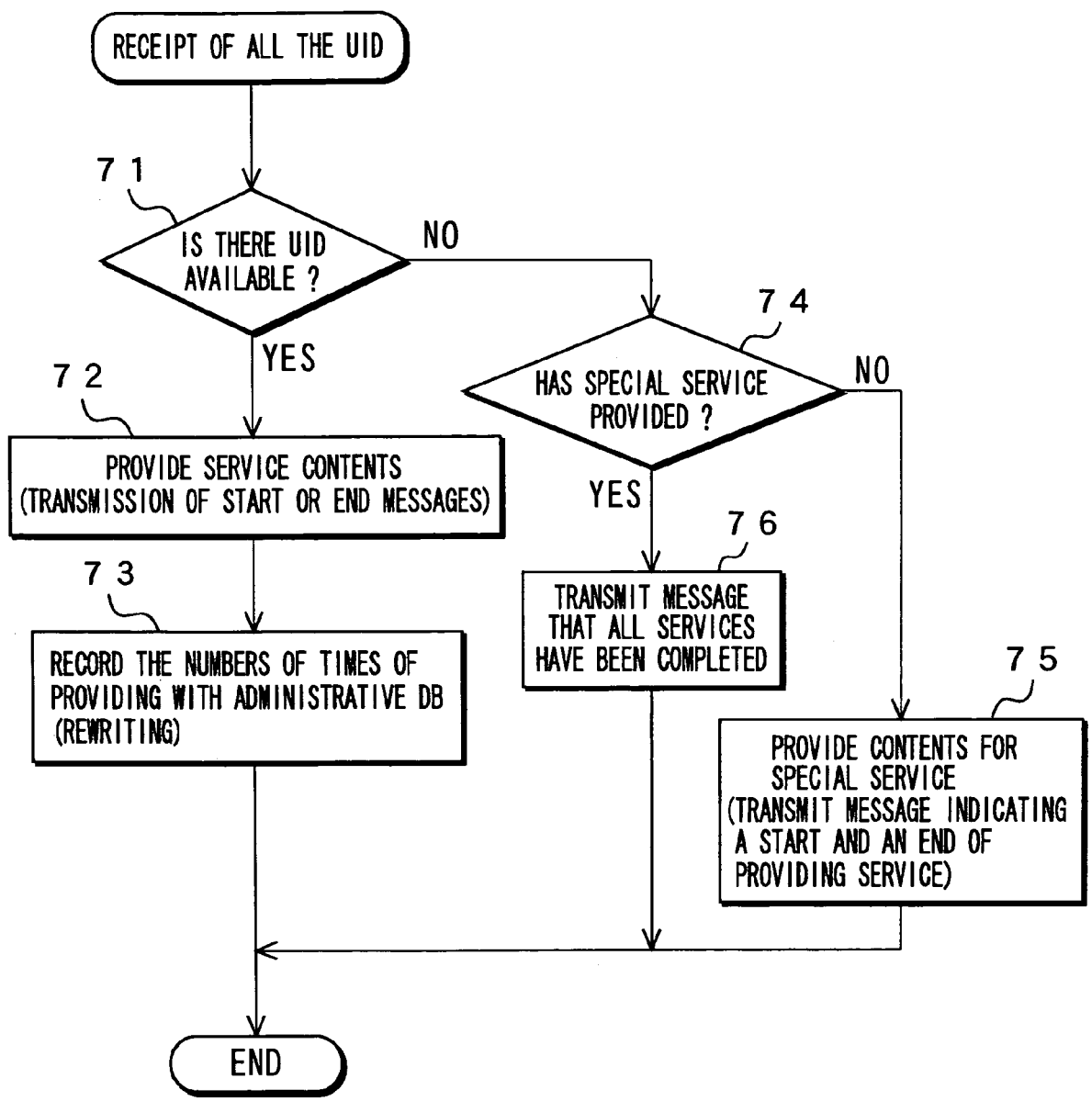
FIG. 9 is a flowchart for showing an example of processing on the side of the administrative server.

Next, a procedure for processing will be described in detail with reference to FIG. 9 and the following. To simplify the description, an embodiment wherein only the same service contents are provided will be described with reference to FIGS. 9 and 10. A procedure for processing by the side of the administrative server 30 will be first described with reference to FIG. 9.

The side of the administrative server 30 first receives all the identification information UID read out of the optical disc 10a and save them. It is checked whether or not the information has a right for receiving the service by checking the saved identification information UID with the administrative information on the side of the administrative server 30 (step 71). This is, it verifies whether there is the identification information UID available therefor. The service is limited and depended on numbers of pieces of the identification information so that the verification on which of a first time access on the side of the administrative server 30 or a second time access or later is done referring to the administrative information.

As a result for identifying the identification information UID transmitted from the terminal device 20, if it is determined that a service is remained, the contents-data for service that has been prepared beforehand corresponding to the transmitted identification information UID is transmitted to the terminal device 20 (Step 72). Prior to transmission of the service contents, in this embodiment, a massage that the contents-data for service will be transmitted is first transmitted to the terminal device 20, and then, the contents-data for service is transmitted. When the transmission of the contents-data for service is completed, a message that the transmission has completed is also transmitted to the terminal device 20. This is done in order to make a start and an end of the transmission of the contents-data for service clear.

The administrative information of the administrative database 33 is rewritten after transmitting the contents-data for service to the terminal device 20 (Steps 73). When total numbers of pieces of the received identification information UID are five, for example, numbers of times available for service on the identification information UID peculiar to the accessed medium are saved with them being decremented by one at every time. Even if one time available for service remains in the administrative information, it is determined that a service can be provided to the terminal device 20.

For example, as shown in FIG. 3A, the optical disc 10a records five pieces of the same identification information UID, so that it is possible to receive the contents-data for service at five times. According to this, the side of the administrative server 30 decrements the numbers of times available for service by one from five at every time an access is done based on the identification information UID.

Thus, when the numbers of times available for service do not remain with regard to any service as a result of referring to the administrative information, it is determined whether or not a special service (special contents-data) has been already provided to the user (Step 74). The special service is referred to a special service that is performed after all services accompanied with the identification information UID has finished and is provided to the user only one time, regardless of numbers of times available for service.

If the special service has not yet provided to the user, contents-data that is prepared as the special service is transmitted to the terminal device 20 (Step 75). In this case, as the above, a predetermined message is transmitted to the terminal device 20 before and after the transmission of the contents-data and information (identifier) indicating that the special service has been provided is recorded in the administrative information corresponding to the identification information UID.

If the special service has been already transmitted in response to the identification information UID transmitted from the terminal device 20, a message that all services have finished is informed. In other words, in a case where the optical disc 10a records five pieces of the identification information, the transmission of the contents-data for service to the terminal device 20 is finished at the time when the administrative server 30 is accessed at five times and then, when the administrative server 30 is accessed at sixth time, the contents-data for the special service is transmitted to the terminal device 20. Thus, when the administrative server 30 is accessed at seventh time, the contents-data for the special service has already transmitted to the terminal device 20, so that a message that all services are finished is transmitted to the user, i.e. the terminal device 20 and then, all services on the optical disc 10a are finished (Step 76).

Figure 10:
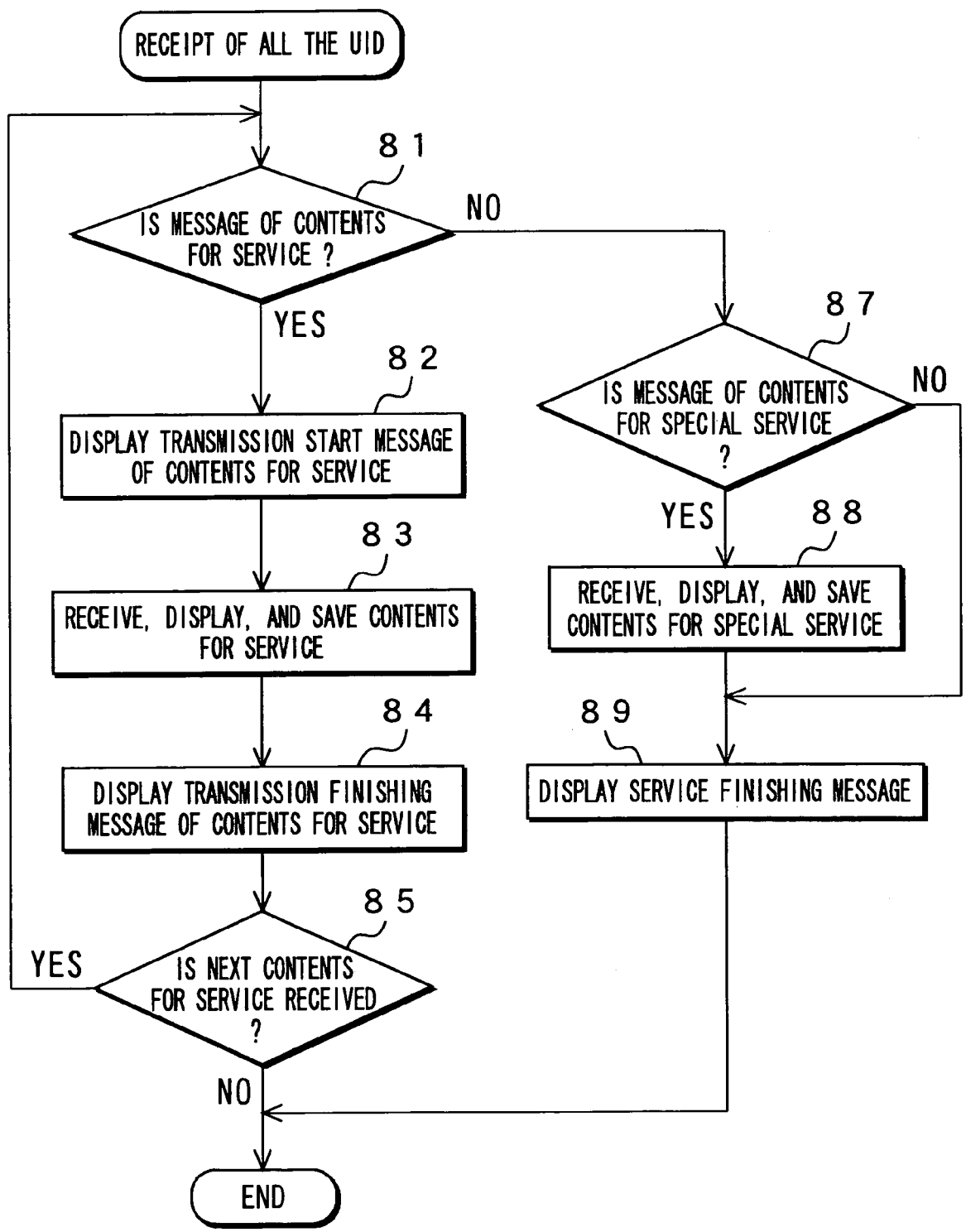
FIG. 10 is a flowchart for showing an example of processing on the side of the terminal device.

FIG. 10 shows an embodiment of processing on the side of the user. After transmitting all the identification information UID to the administrative server 30, the terminal device 20 becomes ready for receiving information and determines whether or not the data transmitted from the administrative server 30 is the message data transmitted at the transmission of the contents-data for service (Step 81). If it is determined to be the message data transmitted at the transmission of the contents-data for service, the display unit 25 displays a transmission start message based on the received data (Step 82). Following the transmission start message, the contents-data for service is transmitted from the server 30 and thus, the terminal device 20 receives it, and stores and saves it in the storage unit 23 (Step 83). According to a circumstance, the display unit 25 may display contents of the contents-data for service at the same time thereof. If receipt of the contents-data for service is finished, data on a transmission finishing message is then transmitted from the administrative server 30 so that the display unit 25 displays the transmission finish message (Step 84). Next, the terminal device 20 becomes ready for receiving information until next contents-data for service is transmitted (Step 85).

On the other hands, when it is determined that the data received at Step 81 is not the message data transmitted at the transmission of the contents-data for service, it is determines whether or not the data next transmitted from the administrative server 30 is the message data transmitted at the transmission of the special service data (Step 87). If it is determined to be the message data transmitted at the transmission of the special service data, the terminal device 20 receives the contents-data for special service and the storage unit 23 stores the received data or the display unit 25 displays it (Step 88). It then receives message data indicating that all services transmitted from the administrative server 30 are finished and the display unit 25 displays a service finishing message based on the received data (Step 89).

If it is not determined to be the message data transmitted at the transmission of the special service data at Step 87, the data transmitted from the administrative server 30 relates to a message that that all services are finished and thus, the process goes to Step 89 where the display unit 25 displays the message that all services are finished.

Thus, the user may enjoy the contents-data for service prepared in the administrative server 30 by only transmission of the identification information UID read out of the optical disc 10a to the administrative server 30. The contents-data available for service is the same contents-data or the contents-data that differ at every time it accesses the administrative server 30. However, in this embodiment, it prohibits the user from specifying his or her preferred contents-data.

As described above, when the side of the administrative server 30 administers numbers of time available for service, it administers numbers of time available for service and the like with referring to the identification information UID read out of the optical disc 10a, which is not any dependent on the terminal device 20. Therefore, if the identification information UID is read out using separate terminal devices 20, the service administration of this optical disc 10a results in perfect, thus refraining the user from providing a service over a service limit.

Next, another embodiment will be described with reference to FIGS. 11 through 14. This embodiment relates to a case where a side of the user may select contents-data for service that is available for service. In this case, as shown in FIG. 11, a list that is subject to individual identification information UID among all the identification information UID the user has transmitted and the contents-data for service is prepared, and then, the list is saved in the administrative database 33. Any identification information UID is made an arbitrary selection to any contents data for service, which selection is done referring to a predetermined table for contents-data. In this list, as shown in FIG. 12, an identifier indicating that the user receives this service is written into a serviced column of this list with respect to the identification information UIDi, which has been transmitted for receiving the service, when the user has received already the service. In FIG. 12, circle symbols indicate that the user has already received the service, for convenience's sake.

At the first access, as shown in FIG. 11, the serviced column of the list is empty. In this list, any service of the contents-data is made an arbitrary enjoy or an arbitrary transmission to the user, and then the serviced identifier is written or added, as shown in FIG. 12, when the service of the contents-data corresponding to the transmitted identification information UIDi is made enjoyable to the user, or is transmitted to the terminal device 20. At second time or later of accessing the administrative server 30, the list as shown in FIG. 12 is provided to the user, so that the user may select contents-data for service among the remained ones.

Figure 13:
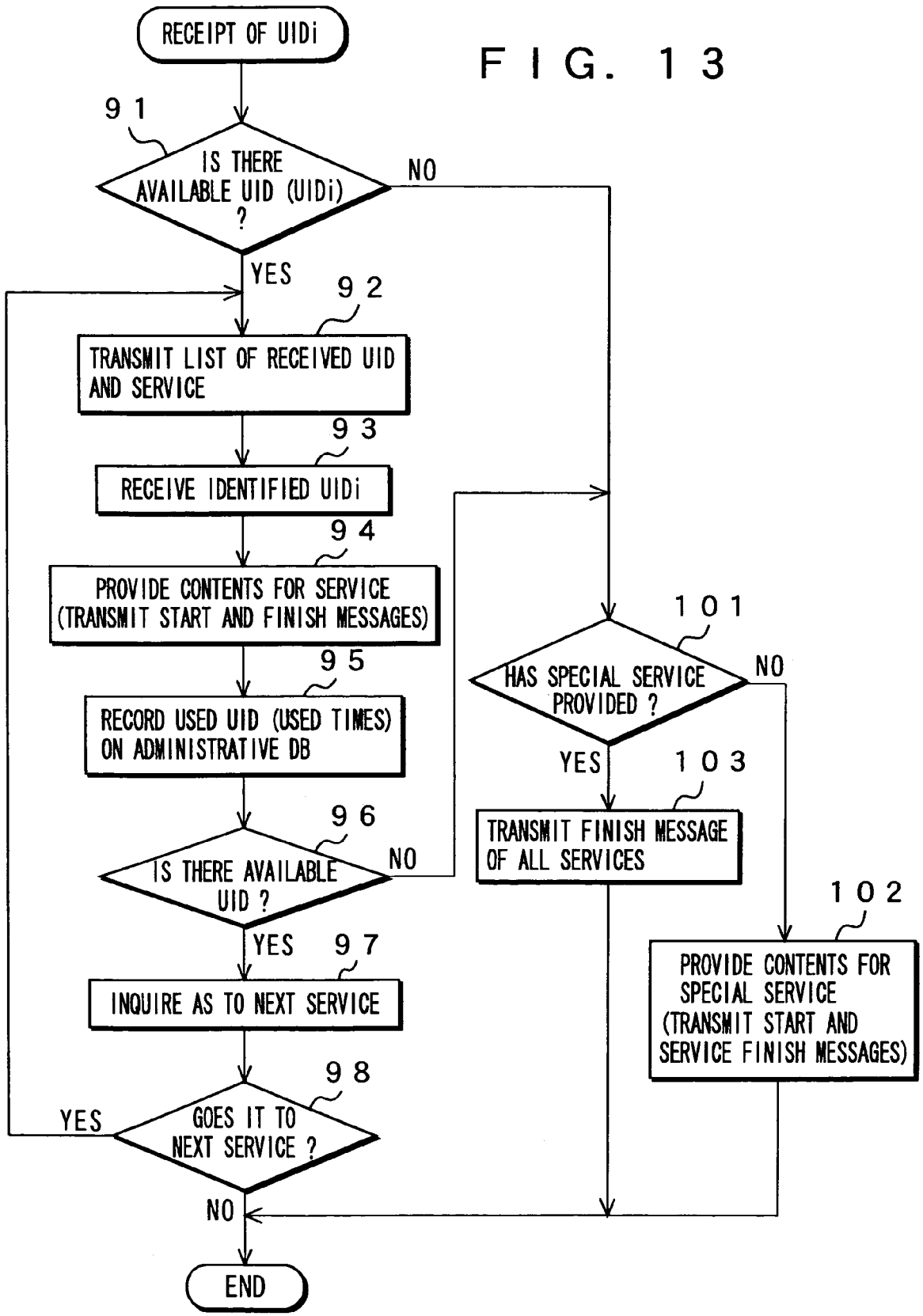
FIG. 13 is a flowchart for showing an example of processing on the side of the administrative server.
Figure 14:
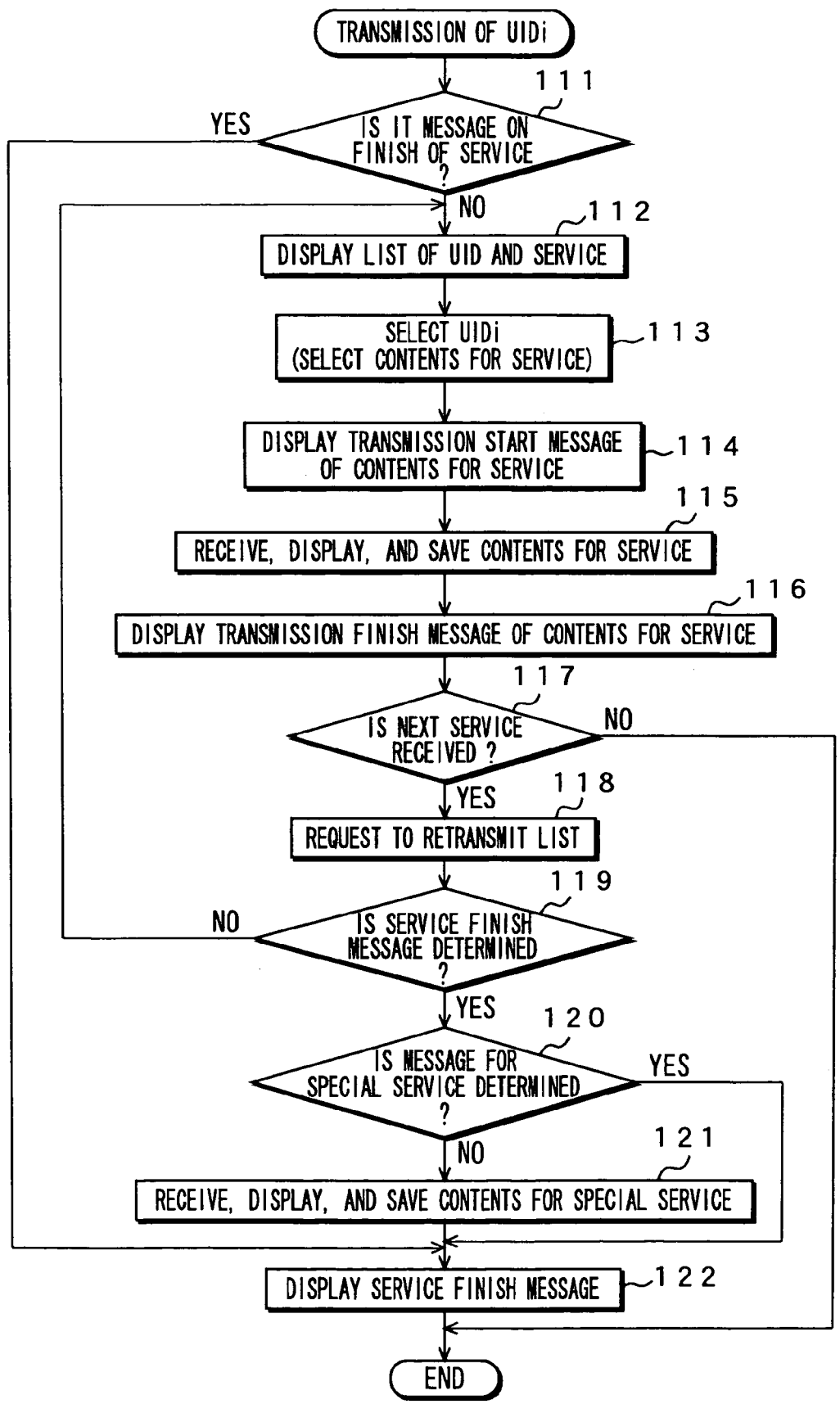
FIG. 14 is a flowchart for showing an example of processing on the side of the terminal device.

FIGS. 13 and 14 show an embodiment of a process of processing with reference to FIGS. 11 and 12.

FIG. 13 shows an embodiment of a process of processing at the side of the administrative server 30 where it is first determined whether or not the received identification information UID is effective. If it is effective, namely, there is identification information UID available for receiving the service (Step 91), the list that is subject to all the identification information UID, which has previously received, and the contents-data available for service is prepared and then, it is transmitted to the side of the user, i.e. the terminal device 20 (Step 92).

A particular identification information UID is identified on the basis of the transmitted list with the user, the contents-data for service corresponding to the identification information UID that has been selected and identified by the user, and transmitted is transmitted and provided to the user (Step 93). At this time, as described with reference to FIG. 10, before and after the transmission of the contents-data for service, items of message data indicating start and finish of the transmission thereof are respectively transmitted (Step 94). It is then recorded in the administrative information saved in the administrative database 33 that any identification information UIDi is identified by the user at this access time (Step 95). At the same time thereof, as shown in FIG. 12, information of the list is updated, namely, the serviced identifier is written.

As shown in FIG. 12, the list is updated, and then, it is determined whether or not further service can be provided to the user when an access is made by the side of the user at the next time based on the identification information UIDi. If there is available identification information UIDi (Step 96), an inquiry as to whether or not the service is accepted for the user is carried out (Step 97). When the data or command to receive the service in succession is received from the user (Step 98), the process goes back to Step 92 where a newest list is transmitted and processing for a contents selection same as the above is repeated.

If all services have already used at Step 96, namely, the identifiers have been already written into all the serviced columns of the list, processing on a special service that has been previously prepared is carried out (Step 101). If the user has not yet enjoyed the special service, message data of the start of transmission and the contents-data for special service are transmitted to the user, i.e. the terminal device 20, and at a stage of the finish of transmission, a message of the finish of transmission is transmitted to the terminal device 20 and then the service processing is completed (Step 102).

On the other hand, if the user has already received the special service, the user may not receive any further service on the optical disc 10a, and thus, in this case, a message that all services are finished is transmitted to the user, i.e. the terminal device 20 and the processing shown in FIG. 13 is finished (Step 103). When the user accesses the administrative server 30 several times, there may be a case where the identification information UID is transmitted from the user over the accepted number of times available for service. In this case, referring to the list shown in FIG. 11, which is contents of the administrative database 33, it is determined that there is no available identification information UID (Step 91). In this case, it waits for determination at Step 101.

Since the user has not yet received the special service in the course of accesses at the accepted numbers of time available for service corresponding to the identification information UID, the process goes to step 102 in this case, while if the access is over the accepted umbers of times available for service, the process goes to Step 103.

FIG. 14 shows an embodiment of processing on the side of the user. After transmitting all the identification information UID to the administrative server 30, the terminal device 20 becomes ready for receiving information and determines whether or not the data transmitted from the administrative server 30 is the final message data on the finish of service (Step 111). If it is not determined to be the final message data on the finish of service, but determined to be the data indicating the list of the identification information UID and the contents for service, the display unit 25 displays the list (Step 112). This identification information UID allows the user to identify the contents-data for service that the user wants to receive among the displayed list (Step 113).

Next, the display unit 25 displays a transmission start message based on the data transmitted from the administrative server 30 (Step 114). Following the transmission start message, the contents-data for service is transmitted from the server 30 and thus, the terminal device 20 receives it, and stores and saves it in the storage unit 23 (Step 115). According to a circumstance, the display unit 25 may display contents of the contents-data for service at the same time thereof. If receipt of the contents-data for service is finished, the display unit 25 displays a transmission finish message based on the data transmitted from the administrative server 30 (Step 116). Next, the terminal device 20 becomes ready for receiving information until next contents-data for service is transmitted (Step 117).

If the user want to keep the next service received at Step 117, he or she operates the input unit 26 to request the administrative server 30 to retransmit the list (Step 118). Since the side of the administrative server 30 has updated the list stored in the administrative database 33 based on the newest information received from the terminal device 20, it retransmit the newest list in response to the request from the user, i.e. the terminal device 20. It is then determined whether or not further received data is the data indicating service finish message (Step 119). If it is determined that the data is the message data about the service finish at Step 119, it is then determined whether or not the data is the transmission start message data for the special service (Step 120). If it is determined that the data is the transmission start message data for the special service at Step 120, the terminal device receives the contents-data for special service transmitted from the administrative server 30 on and on and the storage unit 23 stores the received data or the display unit 25 displays it (Step 121). When it then receives message data indicating that all services are finished, the display unit 25 displays a service finish message based on the received data (Step 122).

If it is determined that the received data is not the transmission start message data for the special service at Step 120, the received data is the one indicating that that the service is finished as doing so at Step 119, and thus, the process goes to Step 112 where the display unit 25 displays the message that the service is finished.

Thus, the user may enjoy the service only at limited times with him or her selecting the contents-data for service according to his or her preference. In this case, it is easy to relate the identification information UID to the contents for service correspondingly if the identification information having different contents is adapted as the identification information UID to be used, as shown in FIG. 3B.

According to the present invention, if a data-recorded recording medium, as shown in FIG. 2, which has been processed with a press is used, multiple pieces of the identification information can be recorded on the medium and thus, it may be used. In this case, the identification information UID is additionally recorded using, for example, high-power laser on the optical disc 10a on which desired data has been recorded. One example of the recording method will be described below with reference to FIG. 15 and the following.

FIG. 15 shows one example of an optical-disc creation system including an identification information recording device. This optical-disc creation system comprises a modulated-signal delivery device 140 for generating modulated signal of the data to be recorded on the optical disc 10a and deliver it, a laser-beam recorder 600 which is an original optical-disc recording device for making an original optical disc 320 according to the modulated signal, a shaping device 700 for shaping a disc substrate using a stamper 330 prepared on the basis of the original optical disc made by the laser-beam recorder 600, and a additional-writing device 200 for additionally writing data to the semi-finished optical disc 340. The additional-writing device 200 is used to record the above-mentioned identification information UID.

The modulated-signal delivery device 140 comprises a recorded-information reproduction unit 150 for reading and reproducing data to be recorded on an optical disc, a modulated-information generation unit 160 for converting the data reproduced by the reproduction unit 150 into a modulated signal having a predetermined format, a modulated-information storage unit 170 for storing the modulated signal output from the generation unit 160, and a modulated-signal output unit 180 for outputting the modulated signal.

The recorded-information reproduction unit 150 sequentially read and reproduces predetermined data recorded on all over the regions in a master optical disc 310, and then supplies it to the modulated-information generation unit 160. The master optical disc 310 is a master medium (information source) of a CD-R disc or the like, in which predetermined data to be recorded on an original optical disc 320 is recorded. The predetermined data is arbitrary data such as music data, image data, or programs.

The modulated-information generation unit 160 converts the data reproduced from the master optical disc 310 into a modulated signal having a predetermined format predefined, writes a modulated signal obtained as a result of the conversion in the modulated-information storage unit 170 and supplies it to the modulated-signal output unit 180. The modulated signal is made up of a bit pattern comprising "1" or "0" prescribed by a predetermined format. At time of modulation processing, as the occasion demands, additional-write relevant information 410 is referred which indicates specification of a region in which the data is to be written additionally, or the like to generate a particular pattern, which will be described, on the optical disc.

The modulated-information storage unit 170 stores the modulated signal generated by the modulated-information generation unit 160. The modulated-signal output unit 180 receives the modulated signal generated by the modulated-information generation unit 160 and outputs a bit pattern comprising "1" or "0" based on the modulated signal to a laser-beam recorder 600 at a predetermined clock speed.

The laser-beam recorder 600 irradiates an original optical disc 320 with laser light modulated on the basis of the modulated signal received from the modulated-signal delivery device 140, thereby performing cutting on the original disc 320, that is, recording data on the original disc 320 by the modulated laser light. Based on the original optical disc 320, a stamper 330 is prepared.

The shaping device 700 shapes a disc substrate which has an irregular pattern based on the data to be recorded using this stamper 330. The semi-finished optical disc 340 has a reflection film and a protection film on a surface of the shaped disc substrate, which refers to an optical disc on which additional-write information has not yet been recorded.

The additional-writing device 200 comprises a modulated-information storage unit 210 for storing additional-write relevant information 410 or a modulated signal, an additional-writing control unit 220 for controlling additional-writing operations of the identification information, and an additional-writing unit 230 for additionally writing the identification information on the semi-finished optical disc 340 under the control of the additional-writing control unit 220.

The modulated-information storage unit 210 stores the additional-write relevant information 410 used by the modulated-signal delivery device 140 or the modulated signal supplied from the modulated-signal delivery device 140. The additional-writing control unit 220 controls, based on the additional-write relevant information 410 or the modulated signal, operations for calculating a region in which additional-write information 420 is recorded and for additionally writing the additional-write information 420, i.e. the identification information in this calculated region.

The additional-writing unit 230 records the additional-write information 420, which is identification information peculiar to the semi-finished optical disc 340 stored in the memory, not shown, thus creating an optical disc 350 as a finished product on which the additional-write information 420 is recorded. This optical disc 350 refers to the above-mentioned optical disc 10a on which multiple pieces of the identification information is recorded.

In the additional-writing device 200, the modulated-information storage unit 170 previously stores a data pattern based on the modulated signal or the additional-write relevant information 410 used by the modulated-signal delivery device 140. According to the data pattern based on the additional-write relevant information 410 or the modulated signal, the additional-writing control unit 220 controls the additional-writing unit 230 so that a region of the optical disc 340 in which the additional-write information 420 is to be recorded is calculated and the additional-write information 420 may be additionally recorded in this calculated region. The additional-writing unit 230 additionally records the additional-write information 420, i.e. the identification information, on the semi-finished optical disc 340 under the control of the additional-writing control unit 220, thus creating the finished optical disc 350.

As a method for additionally writing the identification information as the additional-write information, a method is available for generating a modulated signal in which a un-modulation zone is provided in an arbitrary zone of the modulated signal when information data is modulated in the modulated-signal delivery device to manufacture a semi-finished optical disc and recording additional-write information in the un-modulated zone at the additional-writing device, thus manufacturing an optical disc as a finished product.

FIG. 16 shows its one example. The modulated-signal delivery device 140 acquires from the additional-write relevant information 410 information on an un-modulation zone that is inserted in the data pattern (hereinafter referred to as EFM data pattern) based on the modulated signal. For example, it acquires from the additional-write relevant information 410 information on where the un-modulation zone is inserted in the EFM data pattern or how often the un-modulation zone is to be inserted.

However, a manufacturer of the optical disc optionally may select where un-modulation zone is to be inserted or how many un-modulation zones are to be inserted. It, however, is set so that the semi-finished optical disc 340 in which the un-modulation zone is inserted may control tracking a spot irradiating the optical disc, that is, the consecutive un-modulation zones may not exceed a servo tracking band.

The control methods for this tracking are various species of the methods, and they are not limited in particular. In the example of FIG. 16, a sub-coding portion in which sub-code data should be essentially recorded is set as a non-modulation zone. Besides this sub-coding portion, the un-modulation zone can be also provided at an arbitrary location of a program area in the optical disc where data is recorded excluding a synchronous pattern. In addition to the method such that the un-modulation zones may not exceed a servo tracking band in the tracking control, a plurality of un-modulation zones can be provided at a certain interval or at a random interval.

In accordance with such the additional-write relevant information 410, the modulated-information generation unit 160 serving as a modulation processing unit generates a modulated signal (hereinafter referred to as EFM signal) in which an un-modulation zone is provided at a portion of an EFM data pattern and outputs it to the laser-beam recorder 600. The EFM signal which is output to the laser-beam recorder 600, that is, the EFM signal which is to be recorded on the original optical disc 320 has such a waveform that a signal level may be 0 at the sub-coding portion. The semi-finished optical disc 340 manufactured according thereto has no pit at the sub-decoding portion, which is an un-modulation zone in a state where the additional-write information 420 has not yet recorded as shown in FIG. 16.

The additional-writing unit 230 serving as the recording portion then alters the reflection film of the optical disc 340 by emitting high-power laser, for example, to record the additional-write information 420 additionally as the identification information in the sub-coding portion of the optical disc 340. After additional recording of the additional-write information 420, the pits are formed in the sub-coding portion based on the additional-write information 420 as shown in FIG. 16.

The sub-coding portion that has additionally recorded the additional-write information 420 is skipped when reading sub-code data that should be essentially recorded in the sub-coding portion of the optical disc 350. As described above, the sub-coding portion that has additionally recorded the additional-write information is accessed when reading the identification information out of the optical disc 350. Multiple pieces of the additional-write information 420 may be recorded in one sub-coding portion and the multiple pieces of the additional-write information may be respectively recorded over multiple sub-coding portions.

As the recording method for recording additional-write information such as the identification information on a recorded recording medium, besides the above-mentioned example, there may be available such a method as to comprise the steps of manufacturing a semi-finished optical disc by generating an EFM signal including a particular EFM pattern when the data is modulated in the modulated-signal delivery device and manufacturing a finished optical disc by recording additional-write information, as referencing a particular EFM data pattern generated by the modulated-signal delivery device in the additional-writing device.

INDUSTRIAL APPLICABILITY

The present invention can be applied to a information service system in which a terminal device of the side of user accesses an administrative server that is server device, via a communication line network such as the Internet, thus allowing transmission/reception of information, and a terminal device and a server device which are consisted of the information service system, as well as a recording medium used for the terminal device.

The invention claimed is:

1. A recording medium comprising:
a lead-in region;
a data-recording region positioned on an outer peripheral region relative to the lead-in region; and
a lead-out region positioned on an outer peripheral region relative to the data-recording region, wherein
a predetermined number of pieces of service identification information are recorded in at least one of the lead-in region, the data-recording region, and the lead-out region, with each one of the pieces being individually complete and serving to identify the service associated therewith that is to be provided by a service provider based on the identified service, wherein
said predetermined number of pieces of service identification information are recorded without break over multiple regions in the lead-in region, the data-recording region, and the lead-out region.

2. A recording medium comprising:
a lead-in region;
a data-recording region positioned on an outer peripheral region relative to the lead-in region; and
a lead-out region positioned on an outer peripheral region relative to the data-recording region, wherein
a predetermined number of pieces of service identification information are recorded in at least one of the lead-in region, the data-recording region, and the lead-out region, with each one of the pieces being individually complete and serving to identify the service associated therewith that is to be provided by a service provider based on the identified service, wherein said predetermined number of pieces of service identification information are recorded in a distributed manner over multiple regions in the lead-in region, the data-recording region, and the lead-out region.

3. The recording medium according to claim 1, wherein information for indicating a position where said service identification information is recorded is further recorded in said recording medium.

4. The recording medium according to claim 1, wherein said predetermined number of pieces of the service identification information each have identical contents that all identify a same service and the predetermined number determines a limit as to how many times the same service can be preformed.

5. A recording medium comprising:
a lead-in region;
a data-recording region positioned on an outer peripheral region relative to the lead-in region; and
a lead-out region positioned on an outer peripheral region relative to the data-recording region, wherein
a predetermined number of pieces of service identification information each have different contents that each identify a different service, said service identification information including information particular to said recording medium.

6. The recording medium according to claim 1, wherein data is previously recorded in said data-recording region.

7. The recording medium according to claim 1, wherein said predetermined number of pieces of service identification information are each recorded in a corresponding unmodulated zone in at least one of the lead-in region, the data-recording region, and the lead-out region.

* * * * *